Nov. 3, 1964

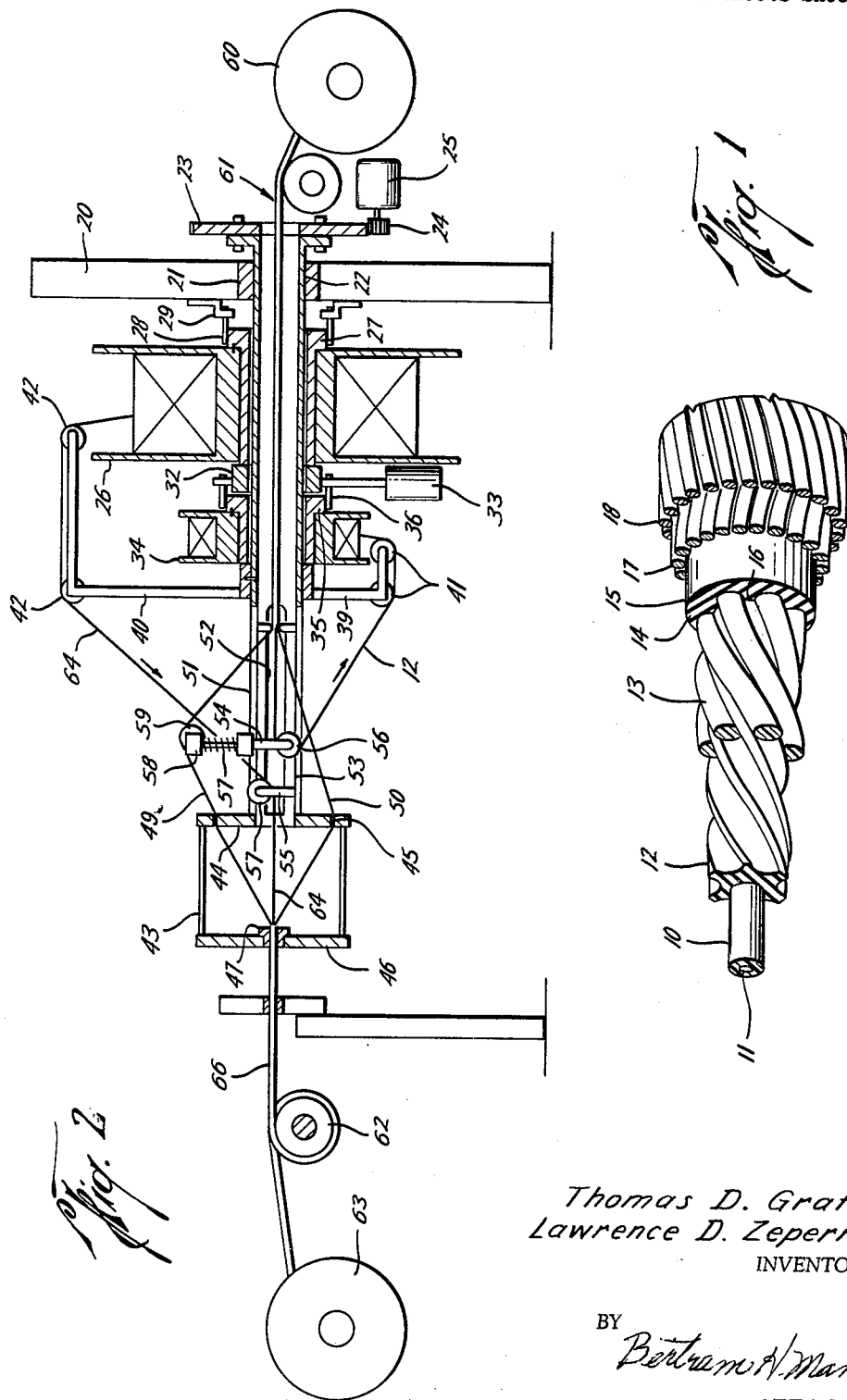

T. D. GRAFTON ETAL 3,154,905

CABLE CONDUCTOR REPLACEMENT APPARATUS

Filed June 27, 1962

Thomas D. Grafton
Lawrence D. Zepernick
INVENTORS

BY

*Bertram H. Mann*

ATTORNEY 3,154,905
CABLE CONDUCTOR REPLACEMENT
APPARATUS
Thomas D. Grafton, Pasadena, and Lawrence D. Zepernick, Houston, Tex., assignors, by mesne assignments, to Vector Cable Company, Houston, Tex., a corporation of Texas
Filed June 27, 1962, Ser. No. 205,760
6 Claims. (Cl. 57—3.5)

This invention relates to equipment for repairing cable cores, particularly, of the type having helically-wound and axial conductor strands embedded in a core matrix.

Such cable cores when provided with sheathing and armor wire form an electrical cable which can be used, for instance, in oil well logging operations. The cores are constructed by feeding an axial conductor with a sheathing core matrix through a closing die, together with outer conductors which are laid helically upon and about the core matrix. The conductor-core matrix assembly is then subjected to an extruding operation which fully and compactly embeds the assembly in an outer sheath. Thereafter, armor strands are helically laid upon the outer surface of the sheathed mass. Conveniently, the various steps may be formed in separate operations. For instance, the conductor-core matrix assembly including outer conductors helically laid upon the central core matrix may be collected upon a spool and, thereafter, fed from this spool to the extruding machine. Accordingly, it is possible to electrically test the components of the cable following the various steps. Heretofore, if testing of the conductor-core matrix assembly disclosed a defect, the entire expensive assembly was rejected as unfit for use.

Accordingly, an object of the present invention is to provide means for replacing a defective conductor strand in a conductor-core matrix assembly.

Another object is to provide apparatus which may be utilized for replacing either one or more of the helically-wound outer conductors or the axial central conductor of a conductor-core matrix assembly.

Still another object is to provide machinery for disassembling the helically-wound outer conductors from the core matrix, directing defective conductors to a discard area, and rewinding the conductor-core matrix assembly with certain of the original conductors and one or more replacement conductors for the replacing of the defective conductors.

According to the present invention there is provided apparatus including a central mast or tunnel through which the core-conductor matrix assembly may be fed and having rotating guide elements for unwinding the outer conductor strands and immediately feeding the non-defective strands into a closing die for reassembly with the cable. The core portion, if non-defective, likewise is fed into the closing die for assembly with the helical outer conductors. Additional guide means is provided for directing either a defective core strand or one or more defective outer conductor strands to a collection spool for discard. A new core or outer strand is fed from a frame which revolves about the axis of the closing die and into the position within the die which would have been occupied by the withdrawn defective conductor strand. One form of the invention is adapted for replacing a core strand only. Another form of the invention may be utilized in replacing the core strand and/or one or more of the helically-wound outer strands.

In the accompanying drawings which illustrate the invention, FIG. 1 is a cut-away sectional view of a portion of a helically-wound, seven conductor cable core as used, for instance, in cables for well logging operations.

FIG. 2 is a more or less schematic sectional representation of a machine for replacing the core portion of the cable core.

Figure 3:
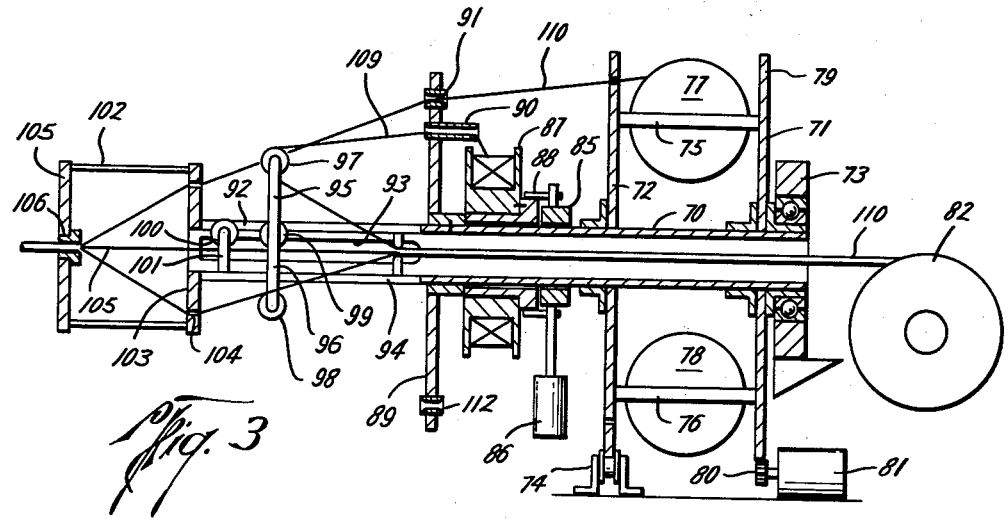
FIG. 3 is a similar view of a modified machine being used in replacing one of the outer conductor strands.

FIG. 1 shows a form of wound, seven conductor cable which uses a core-conductor matrix assembly for which the herein described strand-replacing machines are particularly adapted. The cable comprises a central axial insulated conductor 10 having embedded electrical wires 11. Received about conductor 10 is a core matrix portion 12 upon the surface of which outer conductors 13 are helically laid. The core matrix 12 and outer conductors 13 are assembled in a closing die which somewhat embeds the conductors in the surface of the matrix and spaces the conductors uniformly. The core assembly is then subjected to an extruding operation which applies outer core matrix material 14 under such pressure as to cause inner and outer matrix portions 12 and 14 to merge and to compactly and fully embed all of the conductors 10 and 13. After curing the core, hour-glass shaped ribs 16 extend between helical outer conductors 13. Finally, inner and outer armor strands 17 and 18 are laid helically in opposite directions upon the outer surface 15 of the core.

The apparatus illustrated in FIG. 2 is arranged to replace a defective inner core matrix 12 and the embedded axial conductor 10 in a core-conductor matrix assembly with a new core matrix 64 and embedded conductor. The machine comprises a supporting frame portion designated 20 having an aperture provided with a bearing 21 which journals tubular mast or casing member 22. At its right end, mast 22 is secured to a gear 23 which meshes with a driving pinion 24 operated by a motor 25. To the left of frame 20, mast 22 rotatably mounts a replacement core spool 26 having a collar 27 on its right end which is engaged by a braking device, symbolized by ring 28 secured to frame 20 by means of angular section ring 29. Immediately to the left of spool 26, a ring 32 is rotatably received on the mast and suspends a weighted pendulum 33. Adjacent ring 32 is the discard core-receiving reel 34 also rotatable on casing 22. Reel 34 has a collar 35 engaged by a braking device, symbolized by a ring 36 mounted on a pendulum supporting ring 32. Accordingly, both of spools 26 and 34 tend to remain stationary with respect to the earth during rotation of mast 22.

Figure 5:
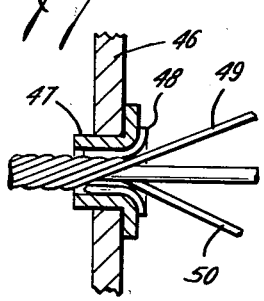
FIG. 5 is an enlarged section of the closing die in operation.

A pair of angled spooling arms or bars 39 and 40 are secured to mast 22 adjacent reel 34. Bars 39 and 40 carry cable guide rollers 41 and 42 at their extremities. Bars 39 and 40, of course, rotate with tubular mast 22. At the left end of mast 22 there is provided a fixture 43 including a plate 44 on its right side having circularly arranged apertures 45, and a plate 46 at its left side in which is centrally mounted a closing die 47. This fixture and die may be constructed in accordance with the corresponding parts illustrated in a co-pending application, Serial No. 192,897, filed May 7, 1962, now Patent No. 3,106,815 issued October 15, 1963, from which it appears that the closing die and fixture rotate with casing 22. As disclosed in the aforesaid co-pending application and in FIG. 5 hereof, die 47 is provided with spacers 48 in the form of wires disposed about and loosely received in the inner periphery of the die. The outer conductors 49 and 50 extend between these spacer wires.

Between angled arms 39 and 40 and fixture 43, mast 22 is provided with longitudinal slots 51, 52 and 53 symmetrically arranged thereabout. Any number of these slots may be provided to accommodate the outer conductor strands being unwound, as will be described. Brackets 54 and 55 within mast 22 mount strand-guiding rollers 56 and 57. A bracket 58 projecting outwardly from the mast 22 mounts a strand, slack-adjusting roller 59 urged outwardly by a coiled spring, as shown. Such slack adjusters may be provided for any of the helical strands in which slack appears due to inequalities in the length of the released strands.

A supply spool 60 for a conductor-core matrix assembly to be processed is positioned adjacent right hand of mast 22. A conductor-core matrix assembly, generally designated 61 and including outer conductors 13 wound about core matrix 12 and axial conductor 10, is shown being delivered from reel 60 through mast 22 to a powered take-up capstan 62 and collecting spool 63 for maintaining the assembly being drawn through the machine at proper tension.

For clarity of illustration, only two outer conductor strands 49 and 50 are shown being unwound from the conductor-core matrix assembly. Conductor 49 is passed over slack take-up guide 59, then through one of the orifices 45 in fixture plate 44 and into the closing die 47 where it is layed helically upon new core matrix strand 64. The other outer conductor 50 passes, from the conductor-core matrix assembly being processed, directly through another one of the orifices 45 in fixture plate 44, then also into the closing die for application about a new core matrix. The replacement core matrix 64 is supplied from reel 26 over guide rollers 42, thence through slot 51 in mast 22, beneath guide roller 57, then centrally through the closing die. The rewound core assembly 66, including the new core matrix portion and the original outer conductors relaid, emerges from the closing die and is fed about draw-off capstan 62 to storage reel 63. The defective core 12 passes around guide roller 56 and thence over rollers 41 on spooling arm 39 to collection spool 34.

It is believed that the operation of the apparatus will be clear from the above description. However, to summarize, the conductor-core matrix assembly 61, including the core and outer conductors laid helically thereon, is passed from reel 60 through hollow mast 22 to the vicinity of slots 51, 52 and 53. At this point, unwinding and separation of the outer conductors from the core matrix is begun, and these conductors 49 and 50 are passed through orifices 45 in fixture plate 44. If slack develops as the unwinding proceeds, slack take-up devices 58, 59 may be inserted where needed. The uncovered core matrix 12 is fed around guide sheave 56 and spooling rollers 41 to recovery reel 34. Replacement core member 64 is fed from spool 26 over guide rollers or sheaves 42, thence through slot 51, under guide sheave 57 and into the closing die together with the other outer strands properly arranged thereabout. Then, when power is applied to mast gear 23 by motor 25 and also to draw-off capstan 62 and reel 63, the defective core matrix will be progressively exposed, diverted, and replaced by a new core matrix, the new core matrix being recovered with the original helically-wound outer conductors and passed through a closing die.

Another form of the invention shown in FIG. 3 includes a central hollow mast member 70 having spaced circular framing parts 71 and 72 secured to the right end thereof. The end of the mast is shown journaled in a support member 73, while inner framing part 72 is supported on a roller 74. Pivotally secured between parts 71 and 72 are cradles 75 and 76 which mount conductor pay-out spools 77 and 78. Righthand framing part 71 has peripheral teeth 79 which mesh with a driving pinion 80 actuated by a motor 81. A pay-out spool 82 is mounted rightwardly of the machine for supplying defective conductor-core matrix assembly to be reprocessed. To the left of framing parts 71 and 72 there are provided a ring or sleeve 85, weighted by a pendulum 86, and a discard conductor spool 87, both rotatable on casing 70.

A brake device, symbolized by collar 88 secured to pendulum sleeve 85, resists rotation of reel 87 relative to the earth. To the left of reel 87, a guide bracket 89 is rigidly secured to the mast 70 and provided with a conductor guide sleeve 90 and grommet-equipped orifices 91 and 112. The tubular casing is also provided with longitudinal slots 92, 93 and 94 for accommodating conductors being directed away from the central path of the conductor-core matrix assembly. Bracket bars 95 and 96 projecting oppositely from the mast mount conductor guide rollers 97 and 98 externally of the mast 70 and guide roller 99 within the mast. An additional guide roller 100 is mounted within the mast on a bracket 101. A fixture 102 at the left end of mast 70 has a right end plate 103 provided with circularly arranged orifices 104. Leftward plate portion 105 of the fixture centrally mounts a rotatable closing die 106.

This figure shows a defective outer conductor strand 109 being withdrawn from conductor-core matrix assembly 110 and laid upon discard reel 87. A replacement conductor 110 is being fed from reel 77 on framing parts 71, 72, through grommet 91 and one of the orifices, 104, into the closing die. The original core matrix member 105 continues directly through fixture 102 into the closing die, while the remaining outer conductor strands are led away from the core through others of orifices 104 and thence into the closing die and helically about the core.

In operation, the conductor-core matrix assembly 110 to be reprocessed is fed as shown centrally through mast 70 and the core portion continues through fixture 102 and the closing die, where it is reconstituted and fed to a draw-off capstan and reel not shown. Adjacent slots 92, 93 and 94, the helical outer conductors are separated from the core, defective conductor 109 being diverted, as explained, to recovery reel 87. The remaining outer conductors are led through others of the longitudinal slots to corresponding fixture orifices 104, then into the closing die for reassembly about the core. If two outer conductors are to be replaced, this can be done by feeding the second replacement conductor from reel 78, through a guide orifice 112 and one of the fixture orifices 104 into the closing die. The second defective conductor will be led around guide roller 98 and thence on to recovery reel 87 or to another recovery point. Of course, any number of the conductors may be replaced simultaneously in this fashion.

Figure 4:
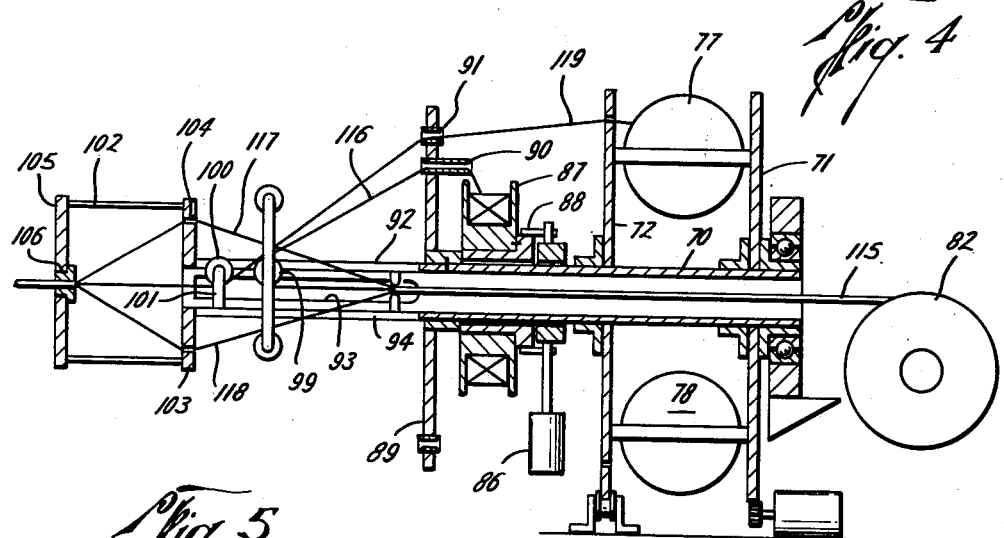
FIG. 4 shows the machine of FIG. 3 being used to replace the core strand.

The apparatus of FIG. 4 is the same as that in FIG. 3, but is shown being used in replacing a defective core member of assembly 115. Here, defective core matrix member 116 is directed around guide roller 99 and thence through guide sleeve 90 to recovery reel 87. At the same time, outer strands 117 and 118 are directed away from the defective core matrix, thence through fixture orifices 104 and into closing die 106. The replacement core matrix 119 is fed from reel 77 through guide grommet 91 and under guide roller 100 then into the center of the closing die. The casing and parts rigid therewith, including reel-carrying framing 71, 72 guide structure 89, and fixture 102 carrying the closing die rotate while core recovery reel 87 is held stationary by the pendulum weighted brake 88 to permit spooling of the withdrawn defective core member. Accordingly, with this form any one of the conductor or core strands may be replaced.

Other changes may be made as will occur to those skilled in the art and the exclusive use of all modifications as come within the scope of the appended claims is contemplated.

We claim:

1. Apparatus for replacing a strand from a wound assembly of strands comprising: a closing die, means mounting said closing die for rotation about its axis, means for guiding the wound assembly along a linear path to said closing die, means in advance of said closing die for diverting at least one strand from the assembly to a discard position, means for feeding a replacement strand through said closing die with the remainder of the assembly, spool means mounted about said guiding means for receiving the discard strand and for supplying the replacement strand, said guiding means being positioned along the center axis of said spool means, and means mounted for rotation about said guiding means for directing the replacement strand from said spool means to said feeding means and for winding the discard strand on said spool means, said directing and winding means both being rotated about said guiding means at the same speed.

2. Apparatus for replacing a strand of a wound cable assembly having a central core strand and at least one spirally wound strand, comprising: a closing die, means for guiding the cable assembly along a linear path through said die, means for diverting the wound strand away from the core strand, rotatable discard means mounted around said guiding means for taking up a strand in a coil having its axis of rotation coincident with the center axis of said guiding means, rotatable supply means mounted around said guiding means for supplying a replacement strand to be fed through said die into assembly with the remainder of the cable, and means rotatable about said guiding means at a single speed for directing one of said strands onto said discard means and directing said replacement strands from said supply means.

3. Apparatus for replacing a strand of a cable assembly having a core strand and at least one outer strand spirally wound thereon, comprising: a closing die, rotatable means for guiding a cable assembly along a linear path to said die, means for diverting the outer strand away and unwinding the same from the core strand, rotatable spool means mounted for free movement around said rotatable guiding means, said spool means having a bore therethrough for receiving said rotatable guiding means therein, means for directing said diverted strand onto said spool means, and means for feeding a replacement strand through said die with the remainder of the cable assembly.

4. Apparatus for replacing the core of a cable assembly having at least one outer conductor wound spirally on said core, comprising: a closing die, means for guiding a cable assembly along a linear path extending through said die, a first member rotatably mounted with respect to the axis of said die for diverting and unwinding said outer conductor from said core, a second member for directing the core away from said die, means for feeding a replacement core through said die, and spool means for supplying said replacement core, said spool means having an axial bore therein, said spool means further being mounted for free movement around said guiding means with said guiding means positioned within said spool bore.

5. Apparatus as described in claim 4 having a plurality of said first members arranged about the axis of said die for diverting and unwinding a plurality of outer conductors from the cable core and directing the same through said die along and about said replacement core.

6. Apparatus for replacing one or more strands from a core assembly including outer strands spirally wound about a central strand on a central axis comprising: means to supply a core assembly having strands spirally wound about a central strand where one or more of said strands is to be replaced, means to collect said core assembly, and means intermediate of said supply and collecting means for removing one or more strands from said core assembly and replacing said removed one or more strands with a like number of different strands, said intermediate means including an axially bored strand supply and discard spool means with said core assembly passing through the bore of said supply and discard spool means, and means forming a part of said intermediate means for directing said different strands from said supply means onto said central strand and for directing said removed strands onto said discard spool means, said directing means being mounted for rotation about said core assembly at a common speed.

References Cited by the Examiner
UNITED STATES PATENTS

| | | | |
|---|---|---|---|
| 353,938 | 12/86 | Harrison | 57—2.5 |
| 383,353 | 5/88 | Gersch | 57—18 |
| 2,019,519 | 11/35 | Wood | 57—3.5 |
| 2,078,630 | 4/37 | Eisler | 57—18 |
| 2,179,334 | 11/39 | Keyes | 57—18 |
| 2,216,189 | 10/40 | Ennis | 57—3.5 |
| 2,484,055 | 10/49 | Shepard | 57—3.5 |

MERVIN STEIN, *Primary Examiner.*